US007755533B2

(12) United States Patent
Harris et al.

(10) Patent No.: US 7,755,533 B2
(45) Date of Patent: Jul. 13, 2010

(54) INTERFEROMETRIC SWITCHED BEAM RADAR APPARATUS AND METHOD

(75) Inventors: Logan Carl Harris, Orem, UT (US); Ryan Lee Smith, Salem, UT (US)

(73) Assignee: ImSAR LLC, Salem, UT (US)

(*) Notice: Subject to any disclaimer, the term of this patent is extended or adjusted under 35 U.S.C. 154(b) by 252 days.

(21) Appl. No.: 11/928,635

(22) Filed: Oct. 30, 2007

(65) Prior Publication Data

US 2008/0174474 A1  Jul. 24, 2008

Related U.S. Application Data

(60) Provisional application No. 60/855,619, filed on Nov. 1, 2006.

(51) Int. Cl.
*G01S 13/00* (2006.01)
*G01S 13/58* (2006.01)

(52) U.S. Cl. .................. 342/95; 342/25 R; 342/25 A; 342/107; 342/109

(58) Field of Classification Search ............ 342/25 R, 342/25 A, 25 B, 25 C, 95–97, 107, 126–128, 342/156, 160, 423, 424, 442, 444, 445, 450, 342/463–465
See application file for complete search history.

(56) References Cited

U.S. PATENT DOCUMENTS

| | | | | | |
|---|---|---|---|---|---|
| 3,842,417 | A | * | 10/1974 | Williams | 342/158 |
| 4,150,375 | A | * | 4/1979 | Ross et al. | 342/21 |
| 4,751,511 | A | * | 6/1988 | Komata et al. | 342/59 |
| 4,794,395 | A | * | 12/1988 | Cindrich et al. | 342/424 |
| 4,947,176 | A | * | 8/1990 | Inatsune et al. | 342/173 |
| 5,093,563 | A | * | 3/1992 | Small et al. | 250/201.9 |
| 5,351,053 | A | * | 9/1994 | Wicks et al. | 342/158 |
| 5,652,589 | A | * | 7/1997 | Ono et al. | 342/70 |
| 5,654,715 | A | * | 8/1997 | Hayashikura et al. | 342/70 |
| 5,751,240 | A | * | 5/1998 | Fujita et al. | 342/70 |
| 5,872,536 | A | * | 2/1999 | Lyons et al. | 342/70 |
| 6,166,677 | A | * | 12/2000 | Kikuchi et al. | 342/25 D |
| 6,292,129 | B1 | * | 9/2001 | Matsugatani et al. | 342/70 |
| 6,388,606 | B1 | * | 5/2002 | Keydel et al. | 342/25 R |
| 6,445,339 | B1 | * | 9/2002 | Yamada | 342/128 |
| 6,573,859 | B2 | * | 6/2003 | Tokoro | 342/70 |
| 6,597,304 | B2 | * | 7/2003 | Fienup | 342/25 R |
| 6,642,908 | B2 | * | 11/2003 | Pleva et al. | 343/876 |
| 6,839,025 | B1 | * | 1/2005 | Reigle | 342/417 |
| 6,950,009 | B1 | * | 9/2005 | Nysen | 340/10.41 |
| 7,026,990 | B2 | * | 4/2006 | Cooper et al. | 342/424 |
| 7,151,482 | B2 | * | 12/2006 | Natsume et al. | 342/147 |
| 7,248,209 | B2 | * | 7/2007 | Shima et al. | 342/173 |
| 7,394,422 | B2 | * | 7/2008 | Nohmi | 342/107 |

(Continued)

*Primary Examiner*—Thomas H Tarcza
*Assistant Examiner*—Peter M Bythrow
(74) *Attorney, Agent, or Firm*—Utah Valley Patent; Steve McDaniel

(57) ABSTRACT

An interferometric switched beam radar apparatus and method are disclosed. In one embodiment, a selected antenna of a planar array of beam forming antennas is activated with a substantially continuous frequency modulated transmit signal and a return signal is received from at least two return antennas that have a known offset distance relative to each other. Phase information is extracted from each return signal and used to present information regarding an operating environment to a user. Each beam forming antenna within the array may correspond to a particular viewing angle within the operating environment.

20 Claims, 7 Drawing Sheets

U.S. PATENT DOCUMENTS

| | | | | |
|---|---|---|---|---|
| H2224 H | * | 10/2008 | Madden | 342/424 |
| 7,436,348 B2 | * | 10/2008 | Nohmi | 342/25 R |
| 7,525,479 B2 | * | 4/2009 | Nagai | 342/158 |
| 2005/0156780 A1 | * | 7/2005 | Bonthron et al. | 342/107 |
| 2006/0164294 A1 | * | 7/2006 | Gottwald et al. | 342/70 |

* cited by examiner

D = Receive Antenna Spacing
Δϕ = Phase Difference for Return Signals
$\theta = \sin^{-1}\left(\frac{\lambda \cdot \Delta\phi}{2\pi \cdot D}\right)$

| TARGET | POSITION | SPEED | VELOCITY |
|---|---|---|---|
| 1 | -0031 +2463 | 2.2 | +2.1 -0.2 |
| 2 | +0021 +2458 | 2.5 | -2.3 +0.3 |
| 3 | -0008 +0486 | 0.3 | +0.2 +0.1 |

INTERFEROMETRIC SWITCHED BEAM RADAR APPARATUS AND METHOD

BACKGROUND OF THE INVENTION

1. Field of the Invention

This invention relates to radar systems.

2. Description of the Related Art

Currently available radar systems typically require expensive bulky components that limit the applications wherein such systems can be deployed. Furthermore, each application of radar technology often requires different processing algorithms. What is needed is a combination of algorithms and methodologies that can be applied to a wide variety of applications using compact lower cost components.

SUMMARY OF THE INVENTION

The present invention has been developed in response to the present state of the art, and in particular, in response to the problems and needs in the art that have not yet been fully solved by currently available radar systems. Accordingly, the present invention has been developed to provide a switched beam interferometric radar apparatus and method that overcome shortcomings in the art.

In one aspect of the present invention an apparatus to provide information regarding an operating environment to a user includes a signal generation module that generates a substantially continuous frequency modulated (FM) transmit signal, a planar array of beam forming antennas, and an antenna selection module that directs the substantially continuous FM transmit signal to a selected antenna of the planar array of beam forming antennas.

The apparatus may also include a phase extraction module that receives return signals from two or more return antennas that have a known offset distance relative to each other and extracts phase information from the return signals. The apparatus may also include a presentation module that receives the phase information and provides information regarding the operating environment to a user. In one embodiment, the information regarding the operating environment includes a spatial map such as a terrain map and one or more tracking graphs that show position and velocity information for one or more targets within the operating environment.

The viewing angles provided by the antenna array may be distinct from each other. In one embodiment, each beam forming antenna has a viewable field that is at least 5 times greater in a non-switching angular dimension than in a switching angular dimension that corresponds to the various viewing angles. The substantially continuous FM signal used to drive the selected antenna within the planar antenna array may be generated by modulating a sinusoidal reference signal with a chirp signal. The planar antenna array may be a printed circuit board with an array of antenna elements that are fabricated thereon.

In another aspect of the invention, a method to provide information regarding an operating environment to a user includes activating a selected antenna within a planar array of beam forming antennas with a substantially continuous frequency modulated transmit signal, receiving a return signal from at least two return antennas, extracting phase information from each return signal, and using the phase information to present information regarding the operating environment to a user. Each beam forming antenna within the planar array may correspond to a particular viewing angle within an operating environment. In certain embodiments, the method includes removing stationary information from the phase information.

The methods described herein may be embodied as a computer program product or computer readable medium comprising computer readable program codes configured to conduct the described methods. It should also be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
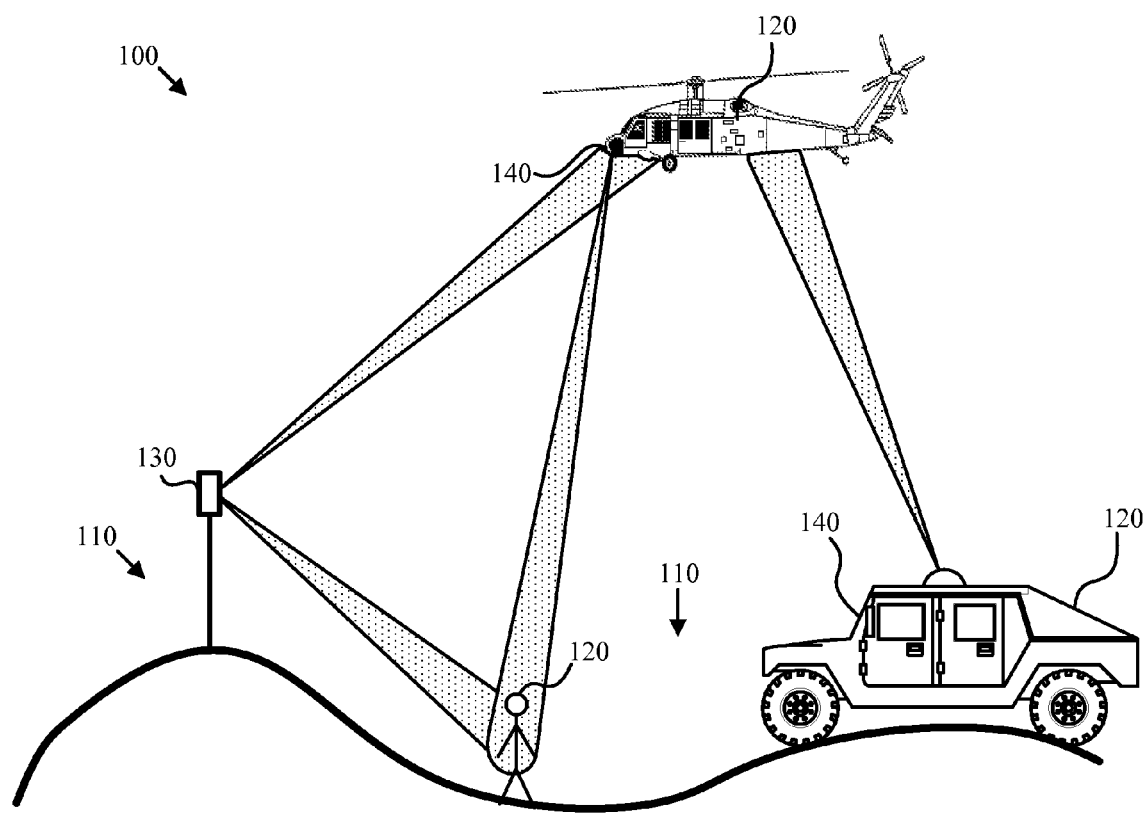
FIG. 1 is a pictorial diagram illustrating a variety of scenarios and environments in which various embodiments of the present invention may be deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program product or computer-readable medium may take any form capable of causing execution of a program of machine-readable instructions on a digital processing apparatus. For example, a computer-readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a pictorial diagram illustrating a variety of scenarios and environments 100 in which various embodiments of the present invention may be deployed. As depicted, the scenarios and environments 100 include a terrain 110, one or more movable targets 120, one or more fixed radar systems 130, and one or more mobile radar systems 140. The radar systems 130 and 140 facilitate mapping the terrain 110 and/or tracking the movable targets 120.

The terrain 110 may include a variety of natural and man made features such as mountains, valleys, hills, canyons, lakes, reservoirs, buildings, bridges, airports, and the like. The movable targets 120 may be land based objects such as vehicles, people, and animals or airborne objects such planes, helicopters, and missiles. Some of the moving targets 120 may include mobile radar systems 140. The fixed radar systems 130 and the mobile radar systems 140 may enable one or more users (not shown) to map the terrain 110 and/or track the movable targets 120. The users may be local or remote users of the fixed radar systems 130 and the mobile radar systems 140. The radar systems 130 and 140 may also be used in a variety of scenarios and applications such as security, traffic monitoring and control, supply chain management, transportation, battlefield management, navigation on both airborne and land vehicles, and the like.

Figure 2:
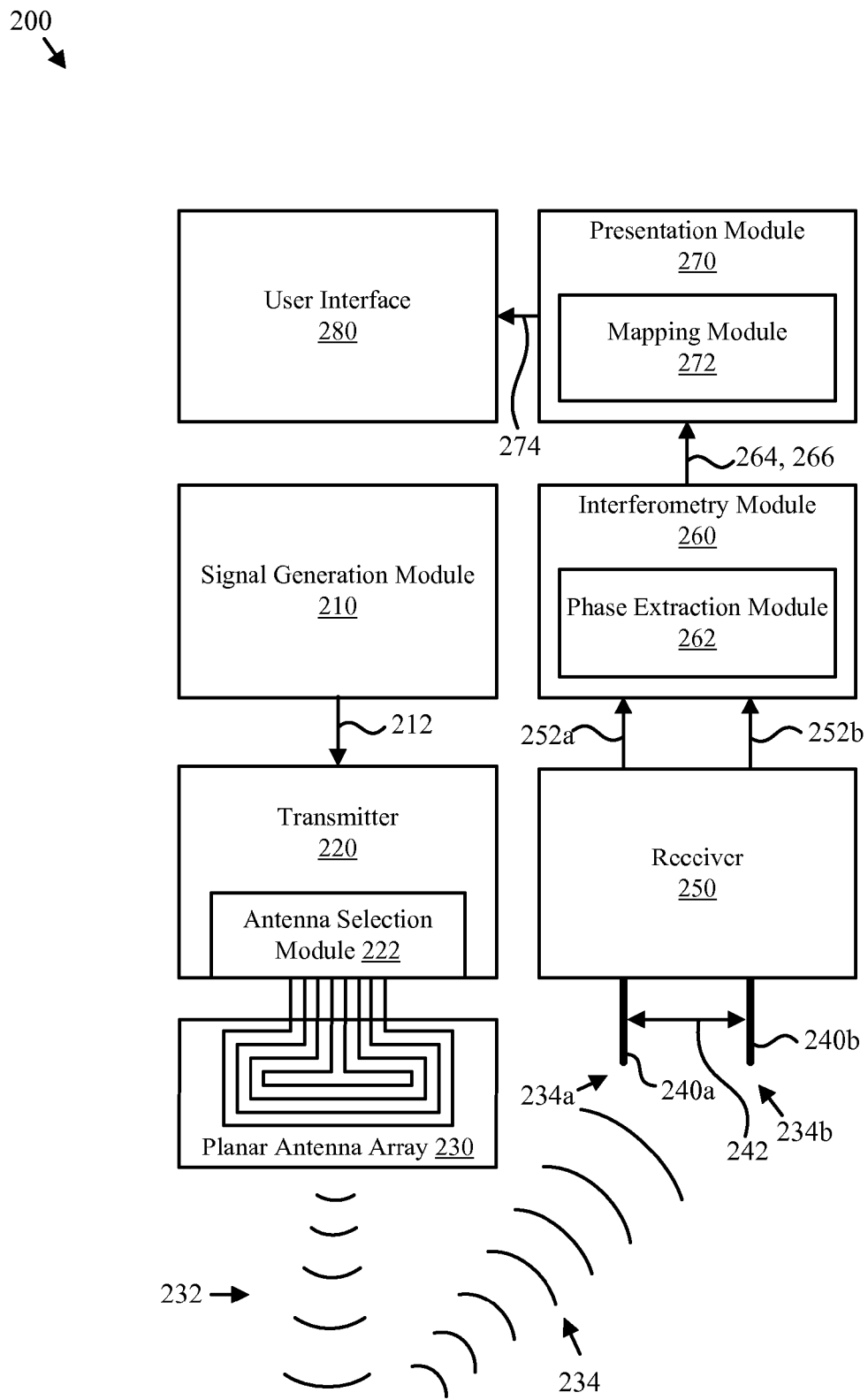
FIG. 2 is a block diagram depicting a switched beam radar apparatus that is consistent with at least one embodiment of the present invention.

FIG. 2 is a block diagram depicting a switched beam radar apparatus 200 that is consistent with at least one embodiment of the present invention. As depicted, the radar apparatus 200 includes a signal generation module 210, a transmitter 220, an antenna array 230, two or more return antennas 240, a receiver 250, an interferometry module 260, a presentation module 270, and a user interface 280. The radar apparatus 200 facilitates terrain mapping and/or target tracking in a wide variety of scenarios and environments such as those described in the description of FIG. 1.

The signal generation module 210 generates a continuous frequency modulated (FM) transmit signal 212. The transmit signal 212 may be cyclic chirp signal whose rate of frequency change is substantially constant within a chirp cycle. In certain embodiments, the continuous FM transmit signal is generated by using a sawtooth wave with relatively constant slopes as an input to a voltage controlled oscillator. In some embodiments, the signal generation module 210 also includes field programmable gate arrays, digital to analog converters, direct digital synthesizers, phase lock loops, radio frequency mixers, modulators and the like.

The transmitter 220 transmits the transmit signal 212 using the antenna array 230 to provide a transmitted signal or beam 232. The transmitter 220 may include an antenna selection module 222 that facilitates switching between various antenna elements within the antenna array 230. Each antenna element within the array 230 may correspond to a different viewing angle. In the depicted embodiment, the antenna array 230 is a planar antenna array. The use of planar antenna elements may reduce the size and cost of the radar apparatus 200.

In certain embodiments, each planar antenna element generates a beam 232 corresponding to a particular viewing angle when activated for transmission. The shape of the beam may be selected for the particular application. In certain embodiments, each beam 232 is relatively broad in one angular dimension and relatively narrow in another angular dimension. In one embodiment, each beam 232 is at least 5 times broader in one angular dimension than in the narrowest angular dimension. In some embodiments, beam switching is conducted along a single angular dimension. In other embodiments, beam switching is conducted along two angular dimensions. Switching between the various viewing angles in one or two dimensions via the various antenna elements of the antenna array 230 reduces information ambiguity and facilitates collecting more precise information regarding the terrain and/or targets within an operating environment.

The return antennas 240 receive reflected images of the transmitted signal 232 that are reflected within the operating environment and delivered to the antennas 240 as the return signals 234. The return antennas 240 may have a known offset distance 242 relative to each other. The direction of the offset distance 242 may correspond to an angular dimension for which greater image resolution is desired. A receiver 250 may receive and amplify the return signals 234 received by each antenna 240 and provide a received signal 252 for each antenna.

The interferometry module 260 may process the received signals 252 and extract interferometric data including phase information 264 and range information 266 from the received signals 252. In the depicted embodiment, the interferometry module 260 includes one or more phase extraction modules 262. The phase extraction modules 262 extract the phase information 264 from the received signals 252. In certain embodiments, the phase information 264 is extracted by modulating each received signal 252 with the (current) transmit signal 212 in order to generate a baseband signal (not shown) for each received signal. Each baseband signal may have frequency components that correspond to the round trip delay (i.e. the range 266) for the transmitted signal 232 as the transmitted signal 232 is reflected from various objects and surfaces in the operating environment and returns to the return antennas 240 as the return signal 234. As detailed in subsequent Figures, the relative phase 264 of the frequency components of the extracted baseband signals may be used to resolve the positions from which the transmitted signal 232 was reflected.

The presentation module 270 receives the phase information provided by the interferometry module 260. In turn, the presentation module 270 may extract or generate human presentable information 274 regarding the operating environment to a user via the user interface 280. In certain embodiments, the presentation module 270 may also use other relevant information such as GPS data, attitude data, and altimeter data to provide human presentable information that is accurate, relevant, and easily discernable to the user interface 280. In the depicted embodiment, a mapping module 272 generates a terrain map that enables a user to visualize the terrain 110 associated with the operating environment.

In certain embodiments and situations, background filtering (not shown) may be used to filter out frequency components or phase information or similar information that remains relatively constant in the signals processed by the apparatus 200. Depending on the embodiment, background filtering may be conducted by the interferometry module 260, the mapping module 272, or the user interface 280. In some embodiments, background filtering may be selectively engaged by the user.

The user interface 280 may include controls, gauges, dials, displays, and the like, that enable use of the radar apparatus 200 and presentation of the human presentable information 274. The user interface 280 or portions thereof may be local or remote to the apparatus 200.

Figure 3:
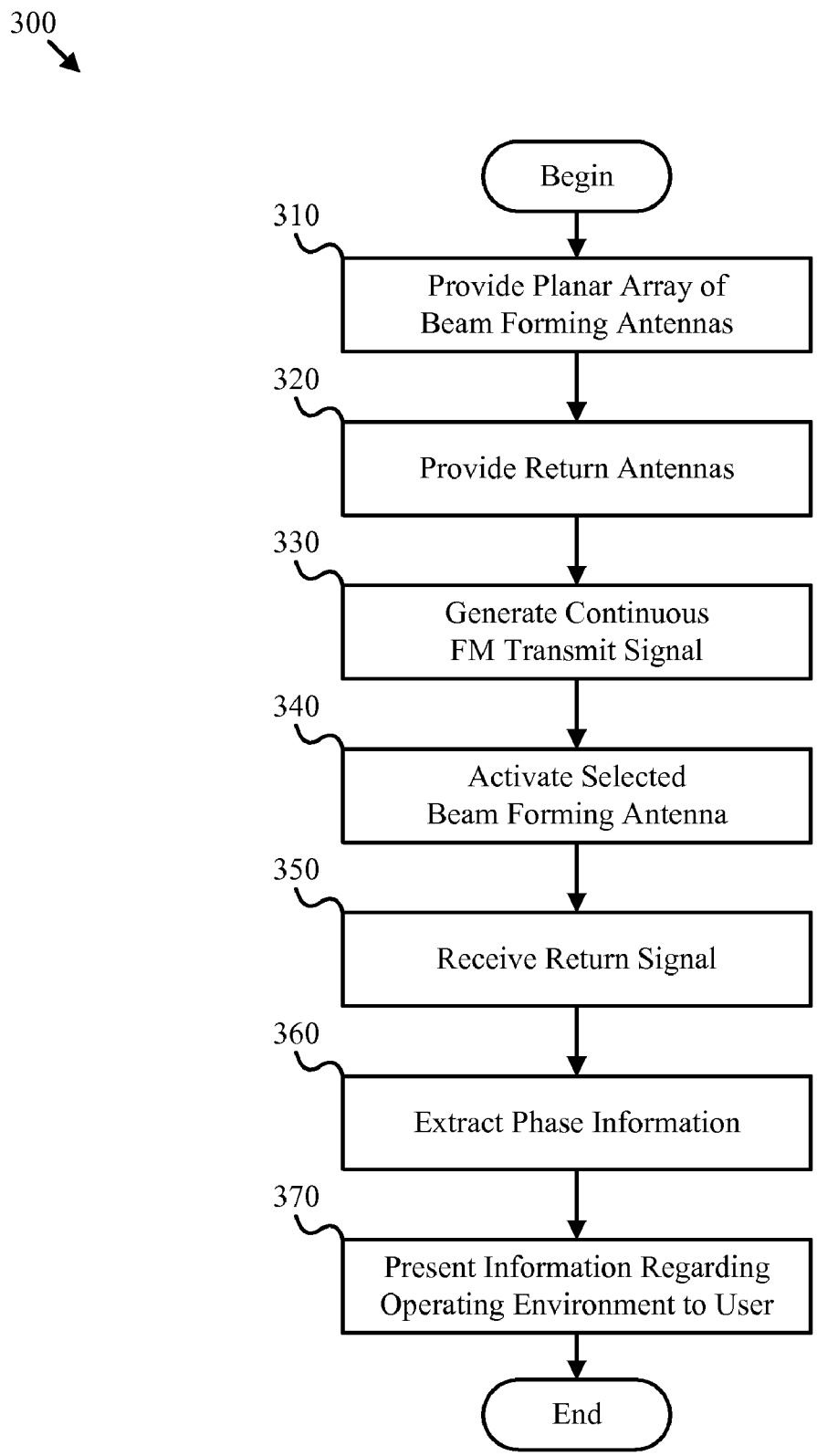
FIG. 3 is a flowchart diagram depicting a switched beam radar method that is consistent with at least one embodiment of the present invention.

FIG. 3 is a flowchart diagram depicting a switched beam radar method 300 that is consistent with at least one embodiment of the present invention. As depicted, the switched beam radar method 300 includes providing 310 a planar array of beam forming antennas, providing 320 two or more return antennas, and generating 330 a continuous FM transmit signal. The depicted method also includes activating 340 a selected beam forming antenna, receiving 350 two or more return signals, extracting 360 phase information from the return signals, and presenting 370 information to a user.

Providing 310 a planar array of beam forming antennas may include providing an antenna array that is fabricated on a single printed circuit board using printed circuit board technology. In one embodiment, the impedance of the printed circuit board is tightly controlled to assure that the transmission characteristics are suitable for antenna transmission. Providing 320 two or more return antennas may include providing conventional or printed circuit antennas that are offset by a known distance in order to accurately calculate the positions of reflections for a transmitted signal.

Generating 330 a continuous FM transmit signal may include generating a cyclic chirp signal. In one embodiment, the FM transmit signal is a chirp signal that cycles between 9.5 and 10.5 GHz. In another embodiment, the FM transmit signal is a chirp signal that cycles between 10.50 to 10.55 GHz. Activating 340 a selected beam forming antenna may include electrically connecting to the beam forming antenna and driving the selected beam forming antenna with the FM transmit signal. Receiving 350 two or more return signals may include receiving and amplifying the return signals with an amplifier.

Extracting 360 phase information from the return signal may include modulating the return signals with the current transmit signal, executing a Fourier Transform and measuring the phase of various Fourier Transform Coefficients to provide phase information for subsequent use. Presenting 370 information to a user may include displaying a spatial map such as a terrain map and/or displaying a tracking graph that shows the current position and velocity of a target within the current operating environment.

Figure 4:
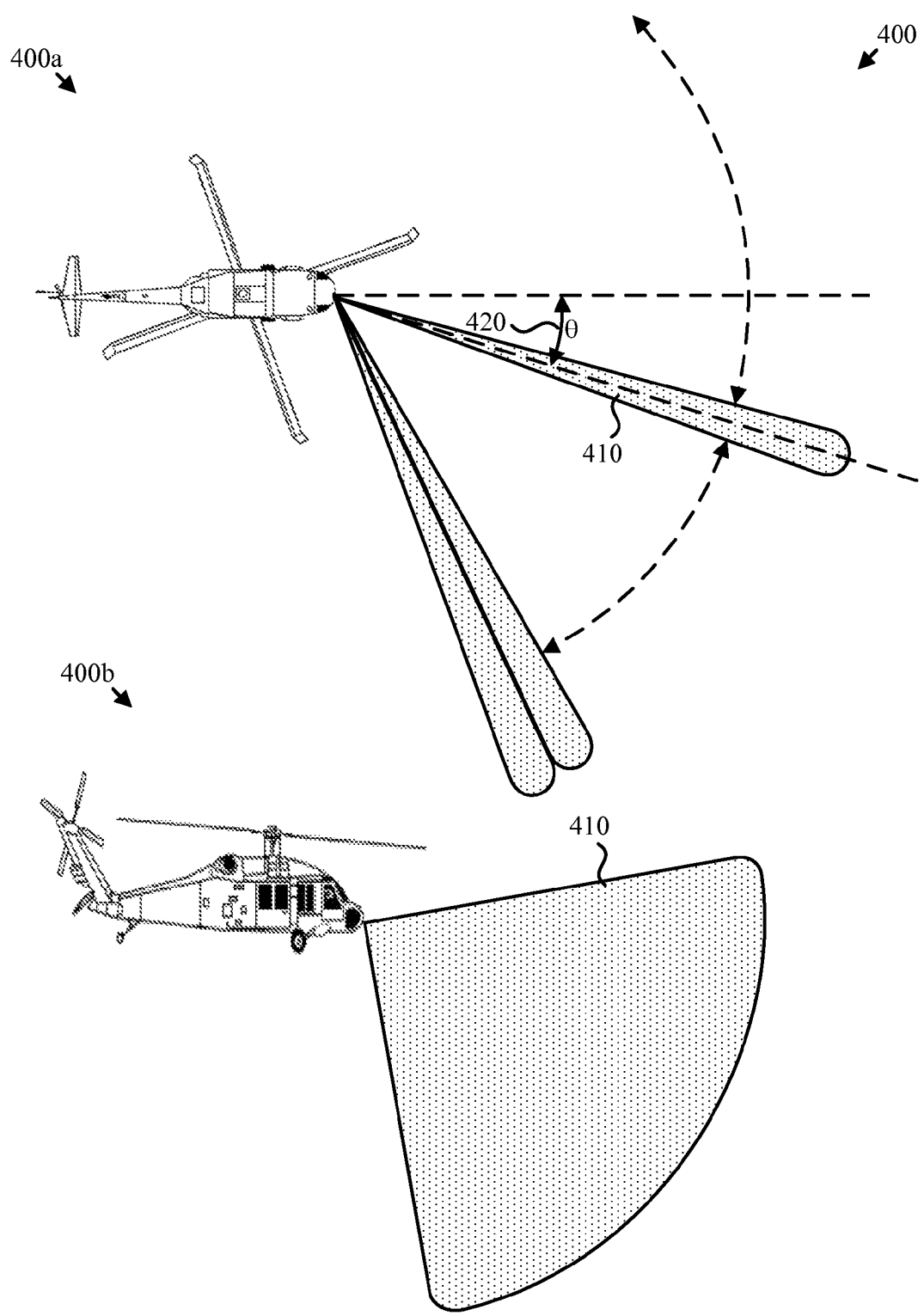
FIG. 4 is a graphical diagram depicting certain aspects of a beam switching methodology that is consistent with at least one embodiment of the present invention.

FIG. 4 is a graphical diagram depicting certain aspects of a beam switching methodology 400 that is consistent with at least one embodiment of the present invention. The beam switching methodology 400 is depicted with a top view illustration 400a and a side view illustration 400b.

The beam switching methodology 400 may include activating a selected antenna to generate a beam 410 at a selected viewing angle 420, and subsequently activating other antennas to generate other beams at other viewing angles. Collectively, the generated beams may cover a broad range of viewing angles despite the use of beams that are relatively narrow in one angular dimension.

In the depicted methodology, each generated beam is azimuthally distinct from the perspective of the transmitter and covers a relatively narrow range of azimuthal angles (see the top view 400a) and a relatively broad range of latitudinal angles (see the side view 400b). To cover a relatively broad range of azimuthal angles, beams are generated or switched along the azimuthal angular dimension. In certain embodiments, the beams are generated in a round robin order. In one embodiment, beams with a target within view of the beam are activated at greater frequencies than beams with no target in view.

Figure 5:
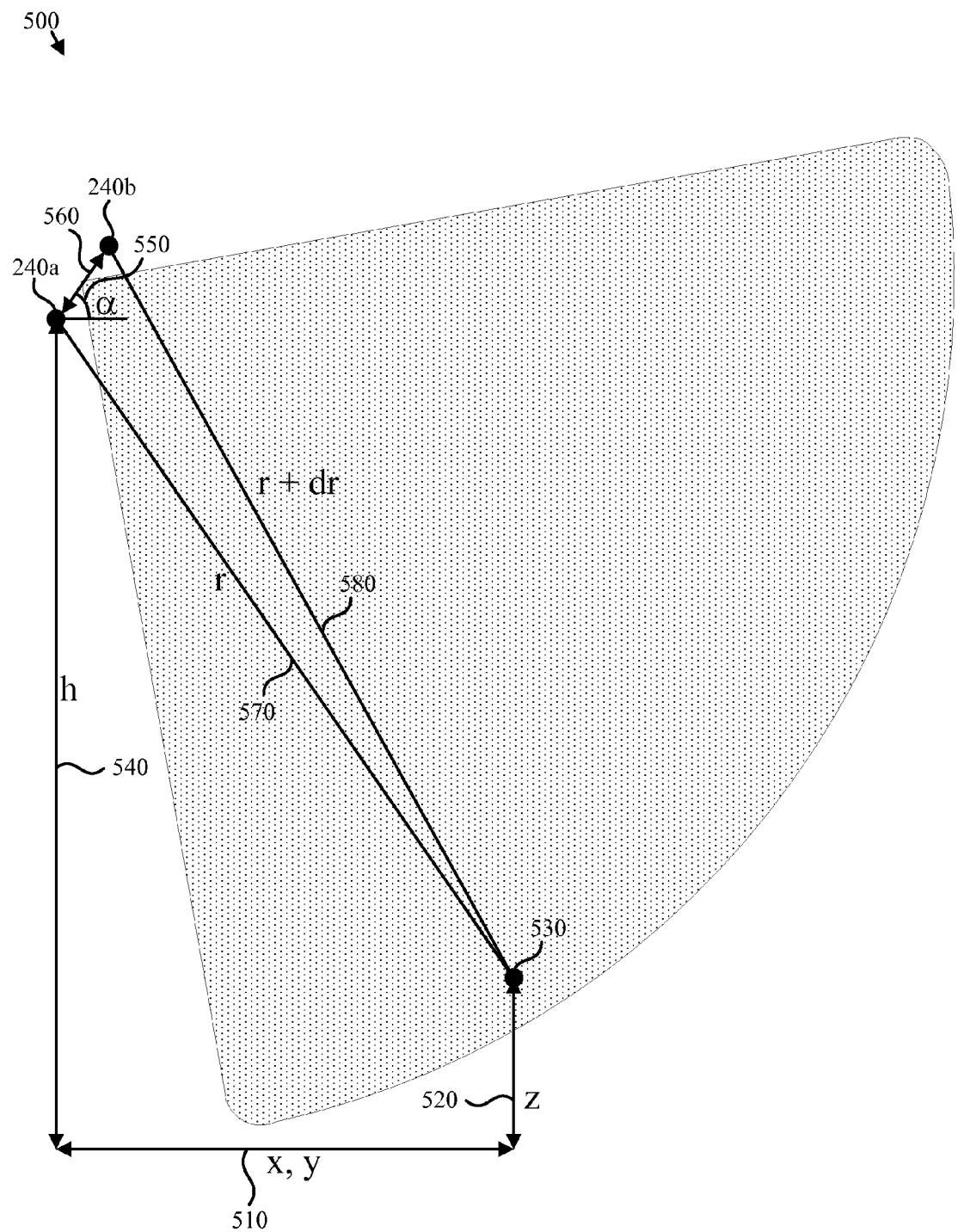
FIG. 5 is a graphical diagram depicting certain aspects of a terrain mapping algorithm that is consistent with at least one embodiment of the present invention.

FIG. 5 is a graphical diagram depicting certain aspects of a terrain mapping algorithm 500 that is consistent with at least one embodiment of the present invention. Using standard geometric relationships, a position 510 and elevation 520 of a terrain point 530 may be calculated by knowing a current height 540, an antenna tilt 550 and a separation distance 560 for the return antennas 240a and 240b in conjunction with a measured distance 570 and a measured distance 580. The measured distances 570 and 580 may be derived from the phase information 264 and the range information 266 extracted from the return signals 234 collected by the return antennas 240a and 240b. In one embodiment, the current height 540 is known from an avionics module and/or a GPS navigation module that indicates the current vertical distance between an aircraft and the ground. The terrain mapping algorithm 500 may be conducted in conjunction with the beam switching methodology 400 or the like.

Figure 6:
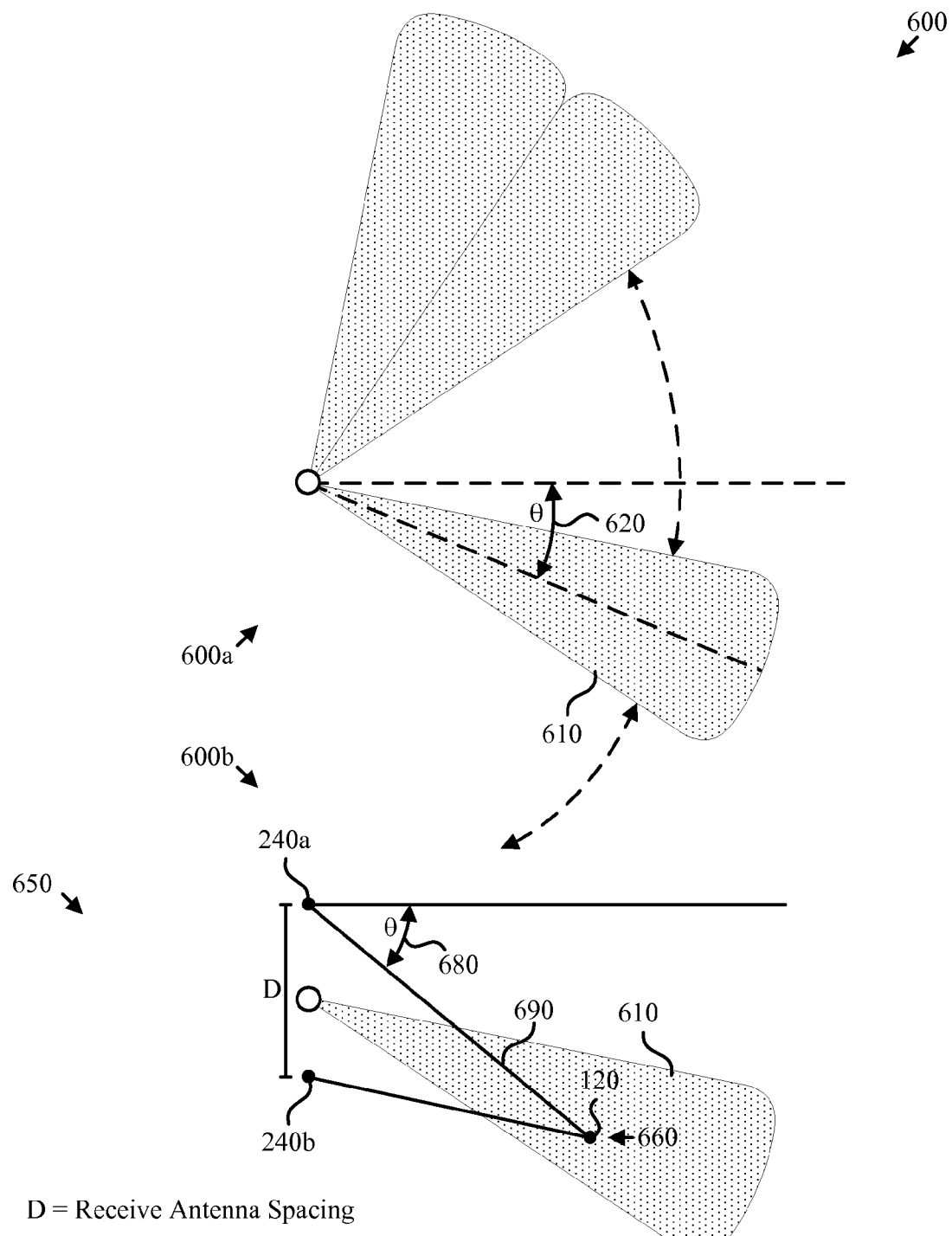
FIG. 6 is a graphical diagram depicting certain aspects of another beam switching methodology and a target tracking algorithm that is consistent with at least one embodiment of the present invention.

FIG. 6 is a graphical diagram depicting certain aspects of another beam switching methodology 600 and a target tracking algorithm 650 that is consistent with at least one embodiment of the present invention. The beam switching methodology 600 is depicted with a beam switching illustration 600a and the tracking algorithm 650 is depicted with a resolution enhancement illustration 600b each of which is illustrated from a top view.

The beam switching methodology 600 may include activating a selected antenna to generate a beam 610 at a selected viewing angle 620, and subsequently activating other antennas to generate other beams at other viewing angles. Collectively, the generated beams may cover a broad range of viewing angles. In the depicted methodology, each generated beam is azimuthally (i.e. horizontally) distinct from the perspective of the transmitter. To cover a broad range of latitudinal angles, the beams are generated or switched along the azimuthal angular dimension. In the depicted embodiment, the beams cover an azimuthal angle of approximately 25 degrees and a latitudinal angle of approximately 45 degrees.

The associated tracking algorithm 650 uses standard geometric relationships to calculate a position 660 of a movable target 120 by measuring a phase difference for a reflected signal at the return antennas 240a and 240b. The phase difference can be used to calculate a target angle 680. The target angle 680 and a measured distance 690 are sufficient to indicate the position 660 of the movable target 120. In addition Doppler information and/or changes in the position 660 over time may be used to calculate a velocity of the target.

The examples depicted in FIGS. 4-6 are exemplary of how the present invention may be deployed. One of skill in the art will appreciated that other orientations, switching patterns, and interferometric techniques may be also be deployed while remaining within the spirit and intent of the present invention and the scope of the appended claims.

Figure 7:
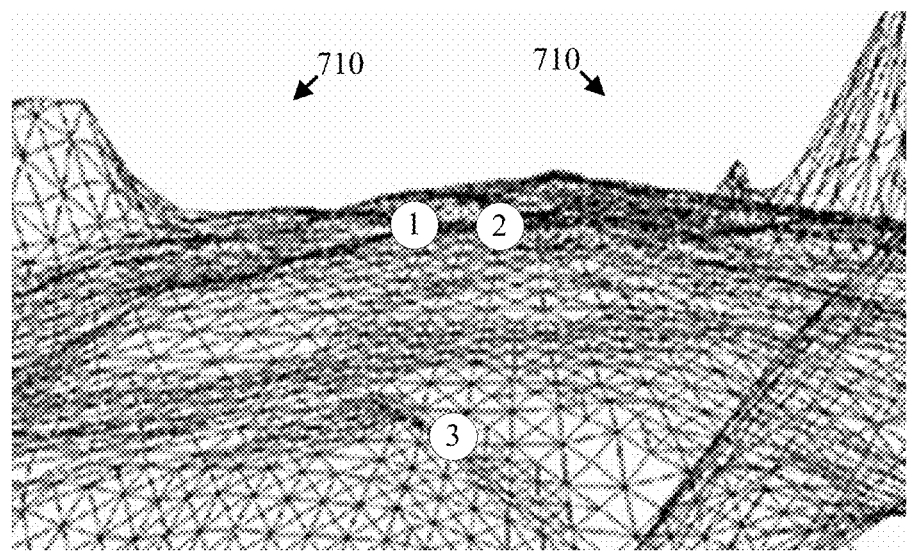
FIG. 7 is a graphical diagram depicting certain aspects of an information display interface that is that is consistent with at least one embodiment of the present invention.
Figure 7:
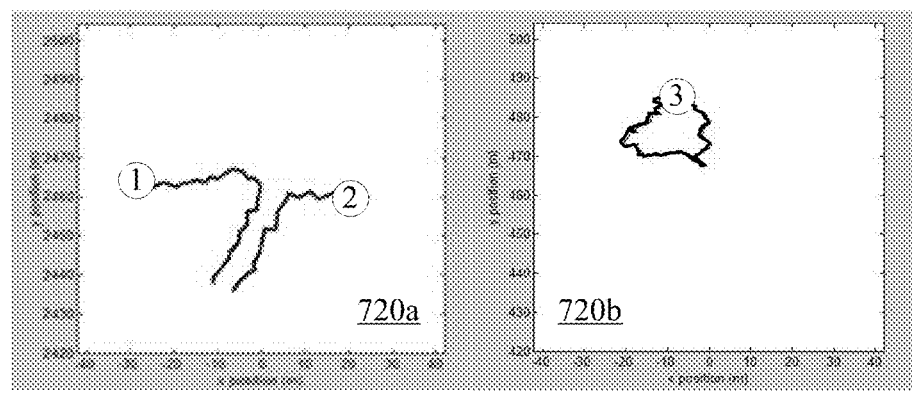

FIG. 7 is a graphical diagram depicting certain aspects of an information display interface 700 that is that is consistent with at least one embodiment of the present invention. As depicted, the information display interface 700 includes a terrain map 710 and tracking graphs 720a and 720b.

The depicted terrain map 710 is a wire mesh diagram generated from elevation data. In one embodiment, the terrain map 710 corresponds to elevation data collected via the beam switching methodology 400 and the terrain mapping algorithm 500.

The depicted tracking graphs 720 show the x, y position of one or more targets relative to a radar transmitter or similar point of reference. The depicted tracking graph 720b corresponds to actual data collected from a prototype of the present invention that was collected for a person walking a closed path in a field at a distance of approximately 480 meters. The data was interferometrically extracted from a radar return signal using the target tracking algorithm depicted in FIG. 6.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide information regarding an operating environment to a user, the apparatus comprising:

a signal generation module configured to generate a substantially continuous frequency modulated transmit signal;

an array of beam forming antennas corresponding to a plurality of distinct first viewing angles within an operating environment;

an antenna selection module configured to receive the substantially continuous frequency modulated transmit signal and provide the substantially continuous frequency modulated transmit signal to a selected antenna of the array of beam forming antennas, the selected antenna corresponding to a selected first viewing angle;

a phase extraction module configured to receive return signals from at least two return antennas having a known offset distance relative to each other and extract range and phase information therefrom;

a mapping module configured to determine a first and a second distance to a plurality of terrain points within the operating environment from the range and phase information, the first and second distance corresponding to the at least two return antennas, each first and second distance defining a second viewing angle to each of the plurality of terrain points that is substantially orthogonal to the selected first viewing angle;

the mapping module further configured to convert the selected first viewing angle and the first and second distance to each of the plurality of terrain points to position and elevation information for each of the plurality of terrain points; and a presentation module configured to provide information regarding the operating environment corresponding to the position and elevation information for each of the plurality of terrain points to a user.

2. The invention of claim 1, further comprising a background filter configured to remove stationary information from the phase information.

3. The invention of claim 1, wherein the information regarding the operating environment comprises a spatial map.

4. The invention of claim 1, wherein the information regarding the operating environment comprises position and velocity information for at least one moving target within the operating environment.

5. The invention of claim 1, wherein the plurality of first viewing angles are azimuthally distinct angles.

6. The invention of claim 1, wherein the plurality of first viewing angles are latitudinally distinct angles.

7. The invention of claim 1, wherein the substantially continuous frequency modulated signal is generated by modulating a sinusoidal reference signal.

8. The invention of claim 1, wherein each beam forming antenna has a viewable field that is at least 5 times greater in a non-switching angular dimension than in a switching angular dimension, and wherein the switching angular dimension corresponds to the plurality of first viewing angles.

9. A computer readable medium comprising computer readable program codes configured to conduct a method that provides information regarding an operating environment to a user, the method comprising:

activating a selected antenna of an array of beam forming antennas with a substantially continuous frequency modulated transmit signal, each beam forming antenna within the planar array corresponding to a particular first viewing angle within an operating environment, wherein activating the selected antenna generates a beam at a selected first viewing angle;

receiving a return signal from at least two return antennas having a known offset distance relative to each other, each return antenna configured to receive reflected images of the frequency modulated transmit signal;

extracting range and phase information from each return signal;

determining a first and a second distance to a plurality of terrain points within the operating environment from the range and phase information, the first and second distance corresponding to the at least two return antennas each first and second distance defining a second viewing angle to each of the plurality of terrain points that is substantially orthogonal to the selected first viewing angle;

converting the selected first viewing angle and the first and second distance to each of the plurality of terrain points to position and elevation information for each of the plurality of terrain points; and using position and elevation information for each of the plurality of terrain points to present information regarding the operating environment to a user.

10. The invention of claim 9, wherein the method further comprises removing stationary information from the phase information.

11. The invention of claim 9, wherein the information regarding the operating environment comprises a spatial map.

12. The invention of claim 9, wherein the information regarding the operating environment comprises position and velocity information for at least one moving target.

13. The invention of claim 9, wherein the method further comprises modulating a sinusoidal reference signal to generate the substantially continuous frequency modulated signal.

14. The invention of claim 9, wherein the method further comprises selecting and activating another antenna within the planar array of beam forming antennas.

15. A method to provide information regarding an operating environment to a user, the method comprising:

activating a selected antenna of an array of beam forming antennas with a substantially continuous frequency modulated transmit signal, each beam forming antenna within the array corresponding to a particular viewing angle within an operating environment, wherein activating the selected antenna generates a beam at a selected first viewing angle;

receiving a return signal from at least two return antennas having a known offset distance relative to each other, each return antenna configured to receive reflected images of the frequency modulated transmit signal;

extracting range and phase information from each return signal;

determining a first and a second distance to a plurality of terrain points within the operating environment from the range and phase information, the first and second distance corresponding to the at least two return antennas, each first and second distance defining a second viewing angle to each of the plurality of terrain points that is substantially orthogonal to the selected first viewing angle;

converting the selected first viewing angle and the first and second distance to each of the plurality of terrain points to position and elevation information for each of the plurality of terrain points; and using position and elevation information for each of the plurality of terrain points to present information regarding the operating environment to a user.

16. The invention of claim 15, wherein the method further comprises removing stationary information from the phase information.

17. The invention of claim 15, wherein the information regarding the operating environment comprises a spatial map.

18. The invention of claim 15, wherein the information regarding the operating environment comprises position and velocity information for at least one moving target.

19. The invention of claim 15, wherein the method further comprises modulating a sinusoidal reference signal to generate the substantially continuous frequency modulated signal.

20. The invention of claim 15, wherein the method further comprises selecting and activating another antenna within the array of beam forming antennas.

* * * * *